United States Patent
Tsai et al.

(10) Patent No.: US 11,461,737 B2
(45) Date of Patent: Oct. 4, 2022

(54) UNIFIED PARAMETER AND FEATURE ACCESS IN MACHINE LEARNING MODELS

(71) Applicant: Microsoft Technology Licensing, LLC, Redmond, WA (US)

(72) Inventors: Chang-Ming Tsai, Fremont, CA (US); Fei Chen, Saratoga, CA (US); Songxiang Gu, Sunnyvale, CA (US); Xuebin Yan, Sunnyvale, CA (US); Andris Birkmanis, Redwood City, CA (US); Joel D. Young, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1030 days.

(21) Appl. No.: 15/959,013

(22) Filed: Apr. 20, 2018

(65) Prior Publication Data
US 2019/0324765 A1 Oct. 24, 2019

(51) Int. Cl.
*G06F 9/448* (2018.01)
*G06Q 10/10* (2012.01)
*G06N 20/00* (2019.01)
*G06F 16/93* (2019.01)
*G06F 16/9032* (2019.01)

(52) U.S. Cl.
CPC ........ *G06Q 10/103* (2013.01); *G06F 9/4484* (2018.02); *G06F 16/90332* (2019.01); *G06F 16/93* (2019.01); *G06N 20/00* (2019.01)

(58) Field of Classification Search
CPC ....................................................... G06F 9/44
See application file for complete search history.

(56) References Cited

U.S. PATENT DOCUMENTS

| 6,981,250 B1 * | 12/2005 | Wiltamuth ............. G06F 9/449 707/999.203 |
| 9,524,510 B2 | 12/2016 | Jalali et al. |
| 2012/0078944 A1 | 3/2012 | Lloyd et al. |
| 2015/0379064 A1 | 12/2015 | Xin et al. |
| 2015/0379072 A1 | 12/2015 | Dirac et al. |

(Continued)

FOREIGN PATENT DOCUMENTS

CA 2953959 A1 1/2016

OTHER PUBLICATIONS

"Non Final Office Action Issued in U.S. Appl. No. 15/959,023", dated Sep. 2, 2021, 43 Pages.

(Continued)

*Primary Examiner* — Jae U Jeon
(74) *Attorney, Agent, or Firm* — Nicholson De Vos Webster & Elliott LLP

(57) ABSTRACT

The disclosed embodiments provide a system for processing data. During operation, the system obtains a function call for a function that calculates an attribute associated with a machine learning model. For each argument of the function call, the system identifies a parameter type of the argument, wherein the parameter type represents a type of data used with the machine learning model. The system also obtains a value accessor for retrieving features specific to the parameter type and obtains a value represented by the argument using the value accessor. The system then calculates the attribute by applying the function to the value and uses the attribute to execute the machine learning model.

20 Claims, 5 Drawing Sheets

(56) References Cited

U.S. PATENT DOCUMENTS

| | | |
|---|---|---|
| 2017/0132230 A1 | 5/2017 | Muralidhar et al. |
| 2018/0082388 A1* | 3/2018 | Takamatsu ............. G06Q 50/16 |
| 2018/0278902 A1* | 9/2018 | Ichikawa ............... G09G 5/391 |
| 2019/0155942 A1 | 5/2019 | Tang et al. |
| 2019/0325352 A1 | 10/2019 | Tsai et al. |

OTHER PUBLICATIONS

"Final Office Action Issued in U.S. Appl. No. 15/959,023", dated Apr. 5, 2022, 37 Pages.
"Advisory Action Issued in U.S. Appl. No. 15/959,023", dated Jul. 5, 2022, 5 Pages.

* cited by examiner

UNIFIED PARAMETER AND FEATURE ACCESS IN MACHINE LEARNING MODELS

RELATED APPLICATION

The subject matter of this application is related to the subject matter in a co-pending non-provisional application filed on the same day as the instant application, entitled "Optimizing Feature Evaluation in Machine Learning," filed on Apr. 20, 2018 and assigned U.S. patent application Ser. No. 15/959,023.

BACKGROUND

Field

The disclosed embodiments relate to data analysis and machine learning. More specifically, the disclosed embodiments relate to techniques for providing unified parameter and feature access in machine learning models.

Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

To glean such insights, large data sets of features may be analyzed using regression models, artificial neural networks, support vector machines, decision trees, naïve Bayes classifiers, and/or other types of machine-learning models. The discovered information may then be used to guide decisions and/or perform actions related to the data. For example, the output of a machine-learning model may be used to guide marketing decisions, assess risk, detect fraud, predict behavior, and/or customize or optimize use of an application or website.

However, significant time, effort, and overhead may be spent on feature selection during creation and training of machine-learning models for analytics. For example, a data set for a machine-learning model may have thousands to millions of features, including features that are created from combinations of other features, while only a fraction of the features and/or combinations may be relevant and/or important to the machine-learning model. At the same time, training and/or execution of machine-learning models with large numbers of features typically require more memory, computational resources, and time than those of machine-learning models with smaller numbers of features. Excessively complex machine-learning models that utilize too many features may additionally be at risk for overfitting.

Additional overhead and complexity may be incurred during sharing and organizing of feature sets. For example, a set of features may be shared across projects, teams, or usage contexts by denormalizing and duplicating the features in separate feature repositories for offline and online execution environments. As a result, the duplicated features may occupy significant storage resources and require synchronization across the repositories. Each team that uses the features may further incur the overhead of manually identifying features that are relevant to the team's operation from a much larger list of features for all of the teams. The same features may further be identified and/or specified multiple times during different steps associated with creating, training, validating, and/or executing the same machine-learning model.

Consequently, creation and use of machine-learning models in analytics may be facilitated by mechanisms for improving the monitoring, management, sharing, propagation, and reuse of features among the machine-learning models.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

Figure 1:
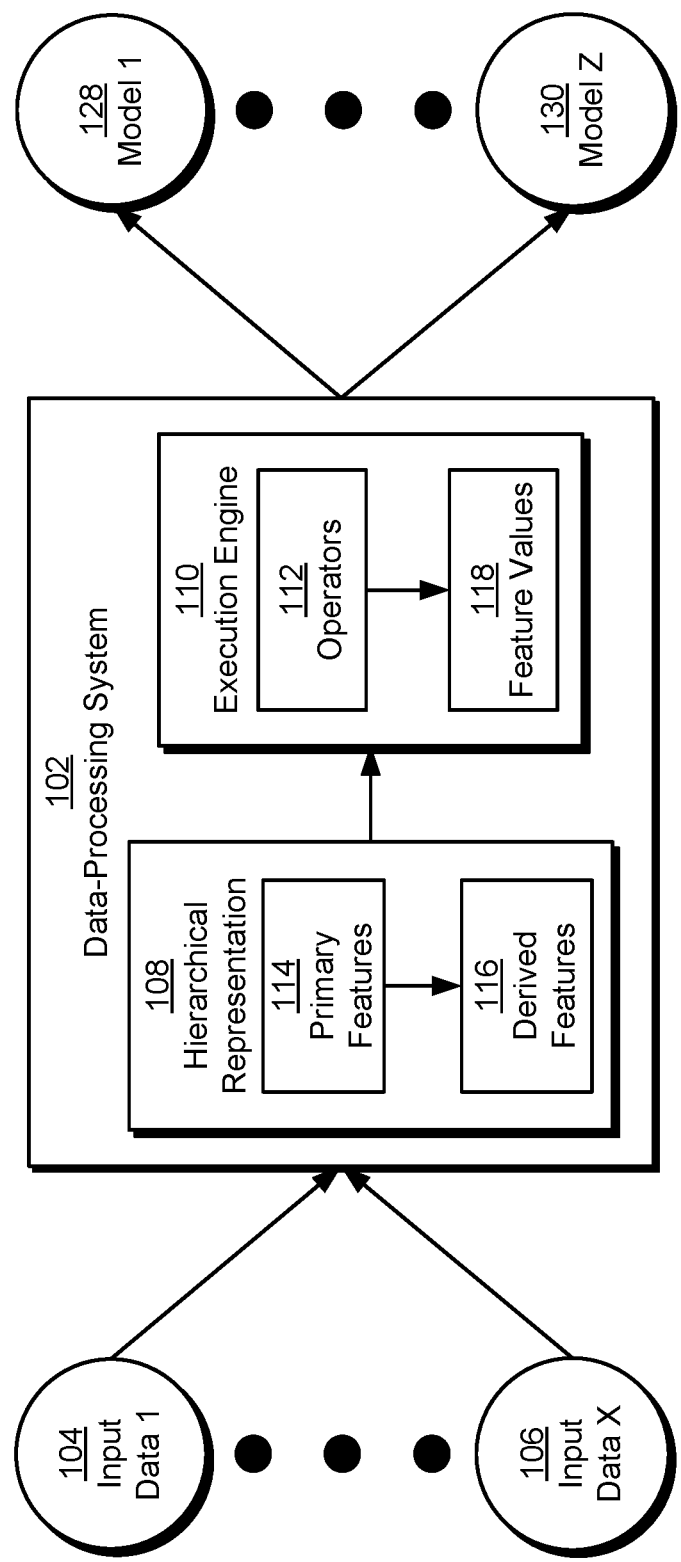
FIG. 1 shows a schematic of a system in accordance with the disclosed embodiments.

The disclosed embodiments provide a method, apparatus, and system for processing data. As shown in FIG. 1, the system includes a data-processing system 102 that analyzes one or more sets of input data (e.g., input data 1 104, input data x 106). For example, data-processing system 102 may create and train one or more machine learning models (e.g., model 1 128, model z 130) for analyzing input data related to users, organizations, applications, job postings, purchases, electronic devices, websites, content, sensor measurements, and/or other categories. The models may include, but are not limited to, regression models, artificial neural networks, support vector machines, decision trees, naïve Bayes classifiers, Bayesian networks, deep learning models, hierarchical models, and/or ensemble models.

In turn, the results of such analysis may be used to discover relationships, patterns, and/or trends in the data; gain insights from the data; and/or guide decisions or actions related to the data. For example, data-processing system 102 may use the machine learning models to generate output that includes scores, classifications, recommendations, estimates, predictions, and/or other properties or inferences.

The output may be inferred or extracted from primary features 114 in the input data and/or derived features 116 that are generated from primary features 114 and/or other derived features 116. For example, primary features 114 may include profile data, user activity, sensor data, and/or other data that is extracted directly from fields or records in the input data. The primary features 114 may be aggregated, scaled, combined, and/or otherwise transformed to produce derived features 116, which in turn may be further combined or transformed with one another and/or the primary features to generate additional derived features. After the output is generated from one or more sets of primary and/or derived features, the output is provided in responses to queries of data-processing system 102. In turn, the queried output may improve revenue, interaction with the users and/or organizations, use of the applications and/or content, and/or other metrics associated with the input data.

In one or more embodiments, primary features 114 and/or derived features 116 are obtained and/or used with a community of users, such as an online professional network that is used by a set of entities to interact with one another in a professional, social, and/or business context. The entities may include users that use the online professional network to establish and maintain professional connections, list work and community experience, endorse and/or recommend one another, search and apply for jobs, and/or perform other actions. The entities may also include companies, employers, and/or recruiters that use the online professional network to list jobs, search for potential candidates, provide business-related updates to users, advertise, and/or take other action.

As a result, primary features 114 and/or derived features 116 may include member features, company features, and/or job features. The member features include attributes from the members' profiles with the online professional network, such as each member's title, skills, work experience, education, seniority, industry, location, and/or profile completeness. The member features also include each member's number of connections in the social network, the member's tenure on the social network, and/or other metrics related to the member's overall interaction or "footprint" in the online professional network. The member features further include attributes that are specific to one or more features of the online professional network, such as a classification of the member as a job seeker or non-job-seeker.

The member features may also characterize the activity of the members with the online professional network. For example, the member features may include an activity level of each member, which may be binary (e.g., dormant or active) or calculated by aggregating different types of activities into an overall activity count and/or a bucketized activity score. The member features may also include attributes (e.g., activity frequency, dormancy, total number of user actions, average number of user actions, etc.) related to specific types of social or online professional network activity, such as messaging activity (e.g., sending messages within the social network), publishing activity (e.g., publishing posts or articles in the social network), mobile activity (e.g., accessing the social network through a mobile device), job search activity (e.g., job searches, page views for job listings, job applications, etc.), and/or email activity (e.g., accessing the social network through email or email notifications).

The company features include attributes and/or metrics associated with companies. For example, company features for a company may include demographic attributes such as a location, an industry, an age, and/or a size (e.g., small business, medium/enterprise, global/large, number of employees, etc.) of the company. The company features may further include a measure of dispersion in the company, such as a number of unique regions (e.g., metropolitan areas, counties, cities, states, countries, etc.) to which the employees and/or members of the online professional network from the company belong.

A portion of company features may relate to behavior or spending with a number of products, such as recruiting, sales, marketing, advertising, and/or educational technology solutions offered by or through the online professional network. For example, the company features may also include recruitment-based features, such as the number of recruiters, a potential spending of the company with a recruiting solution, a number of hires over a recent period (e.g., the last 12 months), and/or the same number of hires divided by the total number of employees and/or members of the online professional network in the company. In turn, the recruitment-based features may be used to characterize and/or predict the company's behavior or preferences with respect to one or more variants of a recruiting solution offered through and/or within the online professional network.

The company features may also represent a company's level of engagement with and/or presence on the online professional network. For example, the company features may include a number of employees who are members of the online professional network, a number of employees at a certain level of seniority (e.g., entry level, mid-level, manager level, senior level, etc.) who are members of the online professional network, and/or a number of employees with certain roles (e.g., engineer, manager, sales, marketing, recruiting, executive, etc.) who are members of the online professional network. The company features may also include the number of online professional network members at the company with connections to employees of the online professional network, the number of connections among employees in the company, and/or the number of followers of the company in the online professional network. The company features may further track visits to the online professional network from employees of the company, such as the number of employees at the company who have visited the online professional network over a recent period (e.g., the last 30 days) and/or the same number of visitors divided by the total number of online professional network members at the company.

One or more company features may additionally be derived features 116 that are generated from member features. For example, the company features may include measures of aggregated member activity for specific activity types (e.g., profile views, page views, jobs, searches, purchases, endorsements, messaging, content views, invitations, connections, recommendations, advertisements, etc.), member segments (e.g., groups of members that share one or more common attributes, such as members in the same location and/or industry), and companies. In turn, the company features may be used to glean company-level insights or trends from member-level online professional network data, perform statistical inference at the company and/or member segment level, and/or guide decisions related to business-to-business (B2B) marketing or sales activities.

The job features describe and/or relate to job listings and/or job recommendations within the online professional network. For example, the job features may include declared or inferred attributes of a job, such as the job's title, industry, seniority, desired skill and experience, salary range, and/or location. One or more job features may also be derived features 116 that are generated from member features and/or company features. For example, the job features may provide a context of each member's impression of a job listing or job description. The context may include a time and location (e.g., geographic location, application, website, web page, etc.) at which the job listing or description is viewed by the member. In another example, some job features may be calculated as cross products, cosine similarities, statistics, and/or other combinations, aggregations, scaling, and/or transformations of member features, company features, and/or other job features.

In one or more embodiments, data-processing system 102 uses a hierarchical representation 108 of features 114 and derived features 116 to organize the sharing, production, and use of the features across different teams, execution environments, and/or projects. Hierarchical representation 108 may include a directed acyclic graph (DAG) that defines a set of namespaces for primary features 114 and derived features 116. The namespaces may disambiguate among features with similar names or definitions from different usage contexts or execution environments. Hierarchical representation 108 may include additional information that can be used to locate primary features 114 in different execution environments, calculate derived features 116 from the primary features and/or other derived features, and track the development of machine learning models or applications that accept the derived features as input.

For example, primary features 114 and derived features 116 in hierarchical representation 108 may be uniquely identified by strings of the form "[entityName].[fieldname]" The "fieldname" portion may include the name of a feature, and the "entityName" portion may form a namespace for the feature. Thus, a feature name of "skills" may be appended to namespaces such as "member," "company," and/or "job" to disambiguate between features that share the feature name but are from different teams, projects, sources, feature sets, contexts, and/or execution environments.

In one or more embodiments, data-processing system 102 uses an execution engine 110 and a set of operators 112 to generate and/or modify sets of feature values 118 that are inputted into the machine learning models and/or used as scores that are outputted from the machine learning models. For example, data-processing system 102 may use execution engine 110 to obtain and/or calculate feature values 118 of primary features 114 and/or derived features 116 for a machine learning model. Data-processing system 102 may also use operators 112 to filter, order, limit, extract, group, deduplicate, apply set operations to, and/or otherwise modify lists or sets of feature values 118 prior to outputting some or all feature values 118 as scores from the machine learning model.

Figure 2:
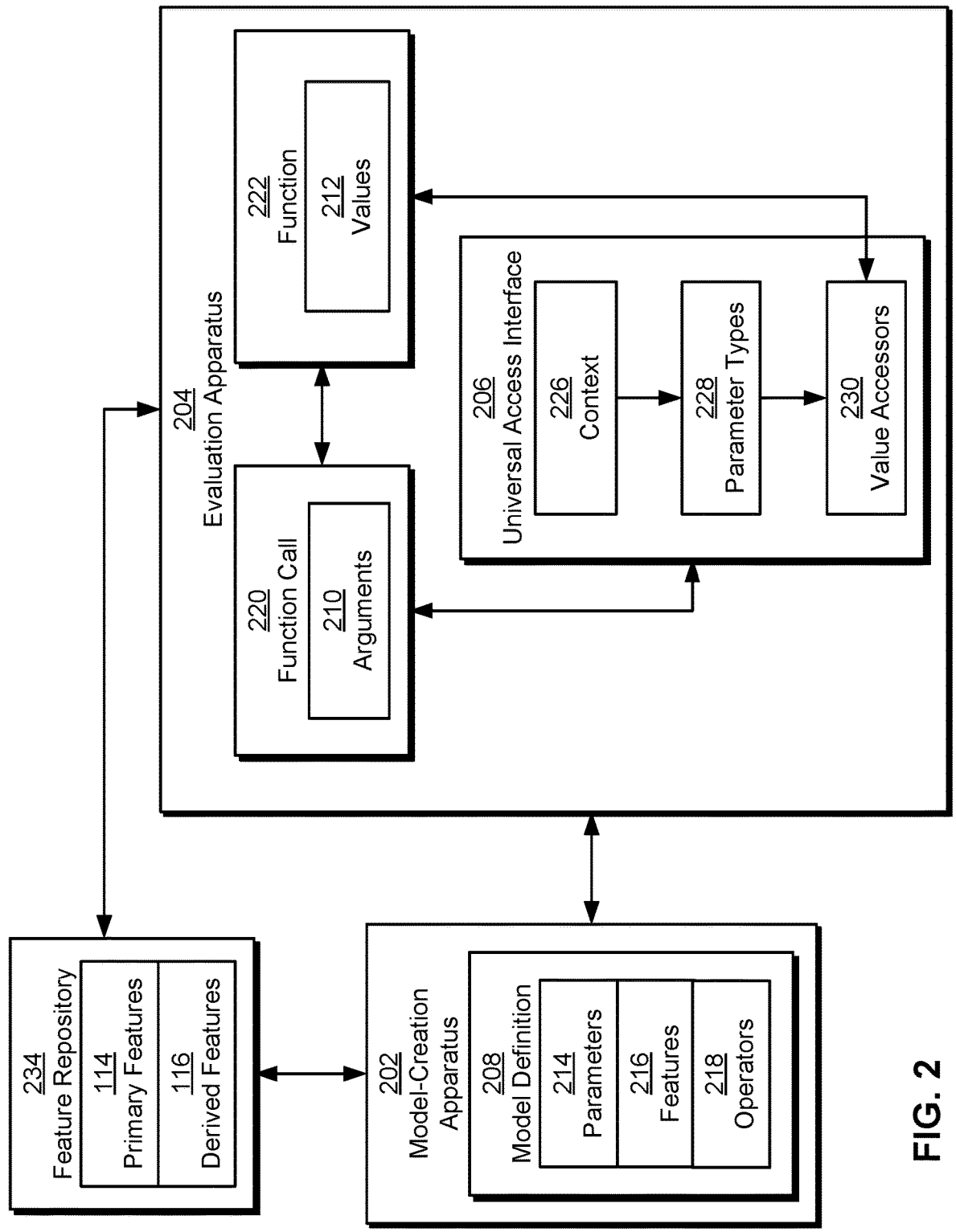
FIG. 2 shows a system for processing data in accordance with the disclosed embodiments.

As shown in FIG. 2, a system for processing data (e.g., data-processing system 102 of FIG. 1) includes a model-creation apparatus 202 and an evaluation apparatus 204. Each of these components is described in further detail below.

Model-creation apparatus 202 obtains a model definition 208 for a machine learning model. For example, model-creation apparatus 202 may obtain model definition 208 from one or more configuration files, user-interface elements, and/or other mechanisms for obtaining user input and/or interacting with a user.

Model definition 208 defines parameters 214, features 216, and operators 218 used with the machine learning model. Features 216 may include primary features 114 and/or derived features 116 that are obtained from a feature repository 234 and/or calculated from other features, as described above. For example, model definition 208 may include names, types, and/or sources of features 216 inputted into the machine-learning model.

Parameters 214 may specify the names and types of regression coefficients, neural network weights, and/or other attributes that control the behavior of the machine-learning model. As a result, parameters 214 may be set and/or tuned based on values of features 216 inputted into the machine learning model. After values of parameters 214 are assigned (e.g., after the machine learning model is trained), parameters 214 may be applied to additional values of features 216 to generate scores and/or other output of the machine learning model.

Operators 218 may specify operations to be performed on lists or sets of documents representing entities and/or features used with the machine learning model. For example, a document may include features that represent a member, job, company, and/or other entity. The document may be represented using a row or record in a database and/or other data store, with columns or fields in the row or record containing data for the corresponding features. During execution of the machine learning model, data in a set of documents may be obtained as input to generate additional features such as derived features 116 and/or scores representing output of the machine learning model. The additional features and/or scores may be stored in additional sets of documents and/or additional columns in the input documents, and operators 218 may be applied to one or more sets of documents before returning some or all documents as output of the machine learning model.

Operators 218 may include a sort operator, a filtering operator, a grouping operator, a union operator, a limit operator, a deduplication operator, an extraction operator, and/or a user-defined operator. The sort operator may order the documents by a feature or other value. For example, the sort operator may be used to order a list of documents 230 by ascending or descending feature values in the documents.

The filtering operator may filter documents in the list by a feature value. For example, the filtering operator may remove a document from a list of documents if the value of a Boolean feature in the document is false and keep the document in the list if the value of the Boolean feature in the document is true. In another example, the filtering operator may filter documents from a list based on a statement that evaluates to true or false for one or more feature values in each document.

The grouping operator may group a list of documents by one or more features. The output of the grouping operator may include a list of document groups, with each document group containing a separate list of documents. The grouping operator may also produce a count of documents in each document group. For example, the grouping operator may group a list of jobs by job title, location, and/or other attributes of the jobs. The grouping operator may also generate a count of jobs in each group as additional output of the operator.

The union operator may apply a union operation to two or more input lists of documents and return a single list of documents containing all documents that were in the input lists. The deduplication operator may deduplicate documents in a list by retaining only one document in a set of duplicated documents (e.g., documents with the exact same features and/or values) within the list.

The limit operator may restrict the number of documents in a list to a specified number. For example, the limit operator may be applied to a set of documents before the set is returned as output from the machine learning model. The limit operator may additionally select the specified number of documents to retain in the list according to the ordering of documents in the list and/or feature values of one or more features in the documents. For example, the limit operator may be used to return the first 100 documents in the list and/or 100 documents from the list with the highest or lowest values of a given feature.

The extract operator may extract specific fields and/or features from documents in a list. For example, the extract operator may be called or invoked with a list of documents and a list of features to be extracted from the documents. In turn, the extract operator may return a new and/or modified list of documents containing the extracted features.

The user-defined operator may include a class, object, expression, formula, and/or operation to be applied to one or more lists of documents. As a result, the user-defined operator may be called with a fully qualified name of the class, object, expression, formula, and/or operation and/or the content of the class, object, expression, formula, and/or operation.

An example model definition 208 for a machine-learning model may include the following:

```
IMPORT com.linkedin.quasar.interpreter.SampleFeatureProducers;
MODELID "quasar_test_model";
MODEL PARAM Map<String, Object> scoreWeights = {
    "value3": 1.0,
    "value4": 1.5,
    "extFeature3" : {"term1": 4.0, "term2": 5.0, "term3": 6.0}
};
MODEL PARAM Map<String, Object> constantWeights = {
    "extFeature5" : {"term1": 1.0, "term2": 2.0, "term3": 3.0}
};
DOCPARAM String lijob;
EXTERNAL REQUEST FEATURE Float extFeature1 WITH NAME "e1" WITH KEY "key";
EXTERNAL REQUEST FEATURE Float extFeature2 WITH NAME "e2" WITH KEY "key";
EXTERNAL DOCUMENT FEATURE VECTOR<SPARSE> extFeature3 WITH NAME "e3" WITH KEY "key";
EXTERNAL DOCUMENT FEATURE VECTOR<SPARSE> extFeature4 WITH NAME "e4" WITH KEY "key";
EXTERNAL DOCUMENT FEATURE VECTOR<SPARSE> extFeature5 WITH NAME "e5" WITH KEY "key";
REQUEST FEATURE float value3 =
```

-continued

```
SampleFeatureProducers$DotProduct(extFeature1, extFeature2);
DOCUMENT FEATURE float value4 =
SampleFeatureProducers$DotProduct(extFeature2, extFeature3);
DOCUMENT FEATURE float score =
SampleFeatureProducers$MultiplyScore(value3, value4, extFeature3);
orderedJobs = ORDER DOCUMENTS BY score WITH DESC;
returnedJobs = LIMIT orderedJobs COUNT 20;
RETURN returnedJobs;
```

The example model definition 208 above includes a model name of "quasar_test_model." The example model definition 208 also specifies two sets of parameters 214: a first set of "scoreWeights" with values that are set during training of the model and a second set of "constantWeights" with names of "term1," "term2," and "term3" and corresponding fixed values of 1.0, 2.0, and 3.0. The example model definition 208 further includes a "DOCPARAM" statement with a data type of "String" and a variable name of "lijob." The "DOCPARAM" statement may define documents used with the model as containing string data types and identify the documents using the variable name of "lijob."

The example model definition 208 also includes a series of requests for five external features named "extFeature1," "extFeature2," "extFeature3," "extFeature4," and "extFeature5." The first two features have a type of "Float," and the last three features have a type of "VECTOR<SPARSE>." The external features may be primary features 114 and/or derived features 116 that are retrieved from a feature repository (e.g., feature repository 234) using the corresponding names of "e1," "e2," "e3," "e4," and "e5" and the same key of "key."

The example model definition 208 further specifies a set of derived features 116 that are calculated from the five external features using a set of "SampleFeatureProducers." The set of derived features 116 includes a feature with a name of "value3" and a type of "float" that is calculated as the dot product of "extFeature1" and "extFeature2." The set of derived features 116 also includes a feature with a name of "value4" and a type of "float" that is calculated as the dot product of "extFeature2" and "extFeature3." The set of derived features 116 further includes a feature with a name of "score" and a type of "float" that is calculated using a function named "MultiplyScore" and arguments of "value3," "value4," and "extFeature3." For example, the "MultiplyScore" may generate a set of scores as output of the machine learning model by combining the features represented by the arguments with model parameters 214 (e.g., "scoreWeights" and/or "constantWeights") with the same names. The "extFeature3," "extFeature4," "extFeature5," "value4," and "score" features are defined as "DOCUMENT" features, indicating that values of the features are to be added to different columns of the documents.

Finally, the example model definition 208 includes a first operator that orders the documents by "score" and a second operator that limits the ordered documents to 20. After the operators are sequentially applied to the documents, the example model definition 208 specifies that the documents be returned as output of the model.

After model definition 208 is obtained using model-creation apparatus 202, evaluation apparatus 204 executes the machine learning model using parameters 214, features 216, and operators 218 in model definition 208. For example, evaluation apparatus 204 may create a class or object that stores an internal representation of the machine learning model from model definition 208. The internal representation may include structures and/or objects that store features 216, feature values, dependencies among features 216 and/or operators 218, and/or values of parameters 214. Next, evaluation apparatus 204 may obtain and/or calculate feature values of features 216 used with the machine learning model. Evaluation apparatus 204 may also apply operators 218 in model definition 208 to lists or sets of documents containing feature values to merge, group, filter, sort, limit, deduplicate, and/or otherwise modify the lists or sets. Evaluation apparatus 204 may then obtain a set of scores from one or more lists of documents as output of the machine learning model and return from execution with the scores.

In one or more embodiments, evaluation apparatus 204 uses one or more dependency graphs associated with features 216 and/or operators 218 to calculate feature values and/or apply operators 218 to lists or sets of feature values. Such feature calculation may be performed in a way that avoids repeated and/or unnecessary calculation of feature values while increasing the efficiency with which multiple sets of feature values are calculated from multiple documents. Using dependency graphs to optimize feature calculation for machine learning models is described in a co-pending non-provisional application filed on the same day as the instant application, entitled "Optimizing Feature Evaluation in Machine Learning," filed on Apr. 20, 2018 and assigned U.S. patent application Ser. No. 15/959,023, which is incorporated herein by reference.

During execution of the machine learning model, evaluation apparatus 204 uses a function call 220 to calculate one or more attributes of the machine learning model. For example, function call 220 may invoke a function that calculates and/or modifies an attribute representing a model parameter (e.g., parameters 214) that controls the behavior of the machine learning model, a feature that inputted into the machine learning model and/or outputted from the machine learning model, and/or a set of documents containing feature values for the machine learning model.

The attributes may also, or instead, include a request parameter that is included in a request associated with an operator and/or a service for generating or extracting a list of documents. For example, the request parameter may specify a number of documents to return using a limit operator and/or store a value that is used as an argument for retrieving a set of documents.

Each attribute may be calculated based on arguments 210 of the corresponding function call 220, which may represent model parameters, request parameters, features, and/or constants that are used to execute the machine learning model. For example, one or more operations, formulas, and/or expressions in the function may be used with arguments 210 to generate one or more values of the attribute and return the values(s) after the function has finished executing.

The execution of evaluation apparatus 204 and/or the machine learning model may be illustrated using the following example code:

```
QuasarModel<DomainEntity> quasarModel =
  QuasarDSL.interpretFile("myModel.quasar");
QuasarModelExecutor<DomainEntity> executor =
  quasarModel.getExecutor(parameters, new ScoringRequestConfig( ));
for (Entity domainEntity : entities) {
  executor.consume(domainEntity);
}
List<Scorable> result = executor.finishUp( );
```

In the example code above, model definition 208 is loaded from a file named "myModel.quasar" into an internal representation of a machine learning model named "quasarModel." The internal representation is used to obtain an "executor" that is used to calculate features 216 and/or apply operators 218 in model definition 208 to the calculated features. The executor is created using a set of "parameters" and a "ScoringRequestConfig" representing a configuration for controlling the behavior of the executor.

Next, the executor is used to "consume" a set of "entities" containing input that is used to calculate feature values of features 216, apply operators 218 to the feature values, and/or otherwise execute the machine learning model. When the "consume" method is called, the executor uses one or more dependency graphs (e.g., operator dependency graph, feature dependency graph, etc.) to calculate features 216 and/or evaluate operators 218 associated with features 216. After feature values for all features 216 are calculated and/or all operators 218 have been evaluated, a "finishUp" method of the executor is used to return a "result" that contains scores and/or other output of the machine learning model.

In particular, the "consume" method may cause the executor to iterate through a set of nodes representing operators 218 in an operator dependency graph for the machine learning model. For example, the executor may evaluate operators 218 according to an evaluation order associated with the operator dependency graph. The executor may also call and/or use a set of feature producers, such as "SampleFeatureProducers" in the example model definition 208 above, to calculate feature values of features 216 that are used with each operator. After the feature values are calculated, the executor may apply the operator to one or more sets or lists of documents containing the feature values. After all operators 218 in model definition 208 have been evaluated, one or more sets of documents and/or features 216 may be returned as output of the machine learning model.

Function call 220 may be used with the example code above to invoke a function in a feature producer to calculate feature values for one or more features 216. Function call 220 may also, or instead, be used with the example code above to invoke a function in an operator to create and/or modify one or more lists of documents containing the feature values. Function call 220 may further be used independently of the example code above to generate and/or update a model parameter or request parameter during execution of the machine learning model.

Moreover, function call 220 may be generalized into the following example representation:

attribute=calculate(argument1,argument2, . . . , argumentN)

In the above representation, a variable named "attribute" is calculated by calling a "calculate" function with N arguments 210. The "attribute" variable may be associated with a primitive data type (e.g., float, integer, Boolean, etc.), a data type with multiple elements (e.g., array, linked list, tree, graph, etc.), an object, and/or another representation of data that is used with the machine learning model. Arguments 210 may represent features, model parameters, request parameters, constants, expressions, and/or other input data that is used to calculate and/or update a feature value, model parameter, request parameter, and/or set of documents represented by "attribute."

Those skilled in the art will appreciate that conventional feature-calculation functions may be defined using an ordered list of predetermined formal parameters. For example, the "calculate" function above may be declared to accept arguments 210 that are either parameters 214 of the machine learning model or features 216 used with the machine learning model, but not a combination of parameters 214 and features 216. Conversely, a different version of the "calculate" function may be declared with formal parameters containing a different permutation and/or combination of features 216, parameters 214, and/or other parameter types 228 (e.g., types of data used with the machine learning model) to allow the function to be called using lists or sets of arguments 210 that differ in parameter types 228.

In one or more embodiments, the system of FIG. 2 includes functionality to provide unified parameter and feature access during invocation of functions (e.g., function 222) for calculating attributes of machine learning models. In particular, evaluation apparatus 204 uses a universal access interface 206 to specify arguments 210 in a given function call 220, obtain values 212 associated with arguments 210, and execute a corresponding function 222 invoked using function call 220 and values 212.

Universal access interface 206 represents an abstraction for static, dynamic, and/or another type of data that is calculated and/or accessed during execution of the machine learning model. For example, universal access interface 206 may include the following example representation:

```
public interface ModelValue<T> quasarModel {
  T getObjectValue(Scorable scorable);
}
```

The above representation includes a generic Java (Java™ is a registered trademark of Oracle America, Inc.) interface named "ModelValue" that contains a type variable identified by "T." The interface includes a method named "getObjectValue" that returns a value of type "T" based on an optional parameter named "scorable," which represents a class containing values of all features 216 used in the machine learning model.

Universal access interface 206 may be used with function 222 by declaring function 222 using the following example representation:

```
int calculate(ModelValue v1, ModelValue v2, . . . ,
    ModelValue vN)
```

The above representation includes a return type of "int" for the "calculate" function and N formal parameters, all of type "ModelValue." As a result, the same declaration allows the "calculate" function to be invoked using various permutations and/or combinations of constants, features, model parameters, request parameters, and/or other parameter types 228, as long as each argument of a corresponding function call 220 to function 222 is wrapped in the "ModelValue" interface.

To process a given function call 220 using universal access interface 206, evaluation apparatus 204 obtains a context 226 associated with each argument of function call 220. Context 226 may be obtained from model definition 208 and/or an internal representation of the machine learning model that is created from model definition 208. For example, context 226 may be an object that stores fully qualified names of all parameters 214, features 216, operators 218, constants, and/or other entities declared in model definition 208. Context 226 may also contain and/or reference classes, objects, data sources, and/or other mechanisms for creating, storing, obtaining, calculating, modifying, and/or applying the entities during execution of the machine learning model.

Next, evaluation apparatus 204 uses context 226 to identify parameter types 228 of arguments 210 in function call 220. As mentioned above, parameter types 228 may include features 216, constants, request parameters and/or model parameters 214, and/or other types of data used with various components of the machine learning model. To obtain a parameter type for each argument in function call 220, evaluation apparatus 204 may match the argument to a name and/or other identifier for a corresponding entity in context 226 and obtain additional information related to the entity from context 226. The additional information may include a class, object, and/or other representation that identifies the parameter type of the entity and/or stores data for the entity (e.g., feature values, parameter values, constants, etc.). For example, the representation may include an implementation of universal access interface 206 that allows the data type and/or parameter type of the entity to be wrapped in universal access interface 206. Alternatively, the representation may be used to generate an object that stores the entity and uses universal access interface 206 to access the entity.

During execution of function 222 represented by function call 220, evaluation apparatus 204 uses value accessors 230 associated with parameter types 228 to obtain values 212 of data represented by arguments 210. Each value accessor may be used to obtain data of a different data type and/or from a different source. For example, value accessors 230 may implement the "ModelValue" interface above and include different implementations of the "getValue" method for obtaining values 212 associated with different data types (e.g., Boolean, double, float, long, object) and/or parameter types (e.g., feature, constant, request parameter, model parameter, etc.).

To obtain a value represented by an argument in function call 220, evaluation apparatus 204 may call a value accessor from a representation of the argument in context 226 and receive the value from the value accessor. Because the value has a specific data type instead of the generic type associated with universal access interface 206, function 222 can verify that the data type of the value matches the expected type of the corresponding argument before using the value to calculate the attribute.

An example representation of function 222 may include the following:

```
public static class SumToDouble implements
DoubleModelFeatureProducer {
  private final ModelValue<Number>[ ] _values;
  private final double _constantSum;
  public SumToDoubleModel(ModelValue<Number>[ ] values,
      Number[ ] constants) {
    _values = values;
    double sum = 0;
    for (Number n : constants) {
      sum += n.doubleValue( );
    }
    _constantSum = sum;
  }
  @Override
  public double calculate(Scorable scorable) {
    double sum = _constantSum;
    for (ModelValue<Number> v : _values) {
      sum += v.getObjectValue(scorable).doubleValue( );
    }
    return sum;
  }
}
```

The representation above includes a class named "SumToDouble" that implements a "DoubleModelFeatureProducer" interface. The class includes a constructor that is declared using a first parameter ("values") that is an array of type "ModelValue<Number>," as well as a second parameter ("constants") that is an array of type "Number." The first parameter may be used to specify a variable number of arguments 210 that can be numeric model parameters 214, request parameters, features 216, and/or other parameter types 228 that can be accessed using the "ModelValue" interface. The second parameter may be used to specify a variable number of arguments 210 that are numeric constants. The constructor stores "values" in a private variable named "_values" and calculates a value for a variable named "_constantSum" as the sum of all numeric constants passed into the constructor, which are converted into a double data type before being included in the sum.

The class also includes a method named "calculate" that returns a double value named "sum." The "calculate" method initially sets "sum" to "_constantSum" (i.e., the sum of all constants passed into the constructor) and subsequently updates "sum" by adding the numeric value stored in each element of "values" to "sum." In particular, the method uses a loop to obtain each element from the array of "_values," calls a "getObjectValue" method for the element to unwrap a numeric value from a value accessor implementing the "ModelValue" interface, and converts the numeric value into a double type before adding the numeric value to "sum." Finally, the method returns "sum" at the end of execution.

By using universal access interface 206 to declare parameters in functions (e.g., function 222) and/or obtain arguments 210 specified in function calls (e.g., function call 220) for the functions, the system of FIG. 2 may enable unified access to various parameter types 228 and/or data types used during the execution of machine learning models. In turn, modelers and/or other users may use the same functions to create and/or modify values 212 and/or sets of values associated with parameters 214, features 216, constants, documents, and/or other parameter types 228 used with the machine learning models without declaring and/or requiring a different version of each function to accommodate a different permutation or combination of parameter types 228 as arguments 210. Consequently, the system may improve technologies for creating, training, and/or executing machine-learning models and/or calculating values used with the machine learning models, as well as applications, distributed systems, and/or computer systems that execute the technologies and/or machine-learning models.

Those skilled in the art will appreciate that the system of FIG. 2 may be implemented in a variety of ways. First, model-creation apparatus 202, evaluation apparatus 204, and/or feature repository 234 may be provided by a single physical machine, multiple computer systems, one or more virtual machines, a grid, one or more databases, one or more filesystems, and/or a cloud computing system. Model-creation apparatus 202 and evaluation apparatus 204 may additionally be implemented together and/or separately by one or more hardware and/or software components and/or layers. Moreover, various components of the system may be configured to execute in an offline, online, and/or nearline basis to perform different types of processing related to creating and/or executing machine-learning models.

Second, model definition 208, primary features 114, derived features 116, arguments 210, values 212, context 226, and/or other data used by the system may be stored, defined, and/or transmitted using a number of techniques. For example, the system may be configured to accept features 216 and/or parameters 214 from different types of repositories, including relational databases, graph databases, data warehouses, filesystems, online services, and/or flat files. The system may also obtain and/or transmit model definition 208, arguments 210, values 212, and/or documents 230 in a number of formats, including database records, property lists, Extensible Markup Language (XML) documents, JavaScript Object Notation (JSON) objects, source code, in-memory objects, and/or other types of structured data.

Figure 3:
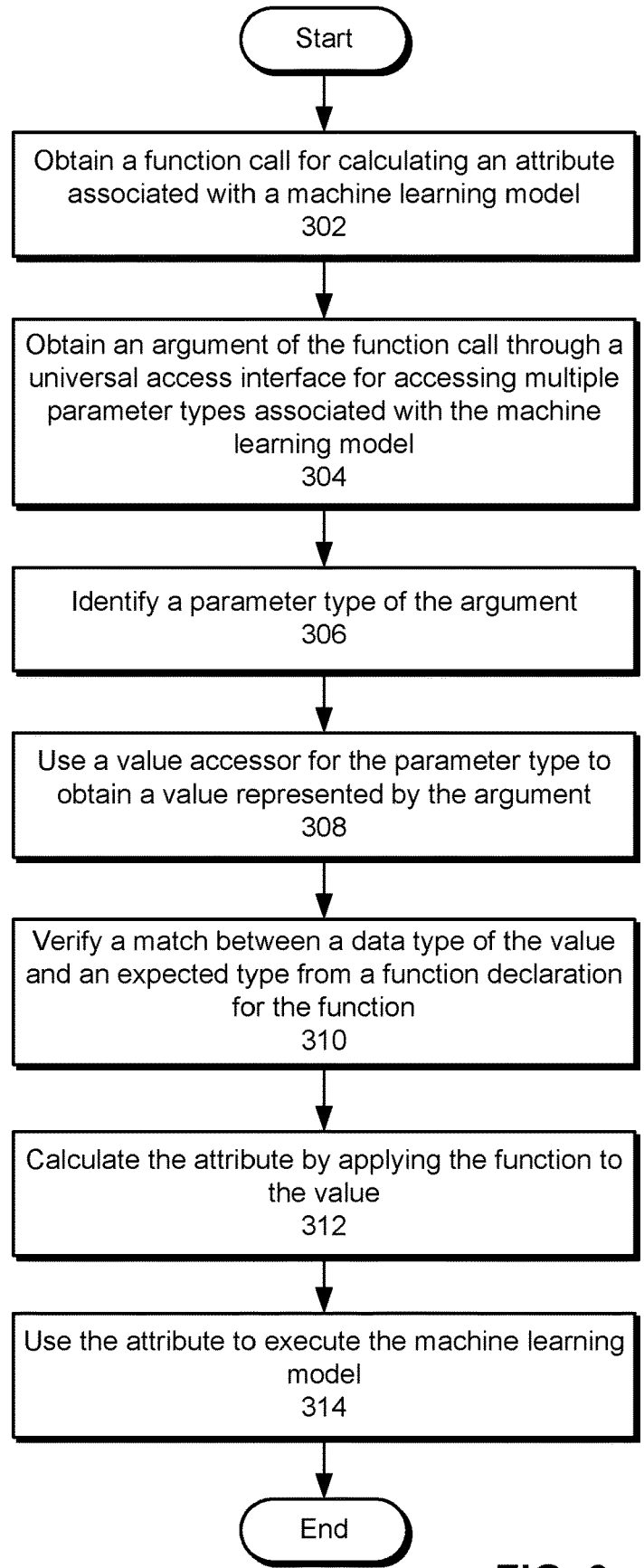
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a function call for calculating an attribute associated with a machine learning model is obtained (operation 302). For example, the function call may invoke a function for calculating, creating, and/or modifying a feature, model parameter, request parameter, and/or a set of documents used to execute the machine learning model.

Next, an argument of the function call is obtained through a universal access interface for accessing multiple parameter types associated with the machine learning model (operation 304). For example, the argument may have a type that is associated with and/or implements the universal access interface. The universal access interface may be a generic interface that allows data of different parameter types (e.g., model parameters, request parameters, features, constants, and/or other types of data used with machine learning models, etc.) to be passed into the function without rewriting the function to handle different permutations or combinations of the parameter types.

A parameter type of the argument is then identified (operation 306), and a value accessor for the parameter type is used to obtain a value represented by the argument (operation 308), as described in further detail below with respect to FIG. 4. A match between a data type of the value and an expected type from a function declaration for the function is also verified (operation 310) before the attribute is calculated by applying the function to the value (operation 312). For example, the data type of the value may be compared to the expected type in the function declaration to verify that the function is called correctly. When the function is called correctly, the function may apply one or more operations to the value and/or values of other arguments in the function call to produce the attribute. The function may then conclude execution by returning the calculated attribute.

Finally, the attribute is used to execute the machine learning model (operation 314). For example, the attribute may include a feature that is inputted into the machine learning model and/or obtained as output from the machine learning model, a model parameter that controls the behavior of the machine learning model, a request parameter that is used with requests to create and/or modify lists of documents, and/or one or more lists of documents. As a result, the attribute may affect additional calculations performed during execution of the machine learning model, the behavior of the machine learning model, values outputted by the machine learning model, and/or the number of outputted values returned after the machine learning model completes execution.

Figure 4:
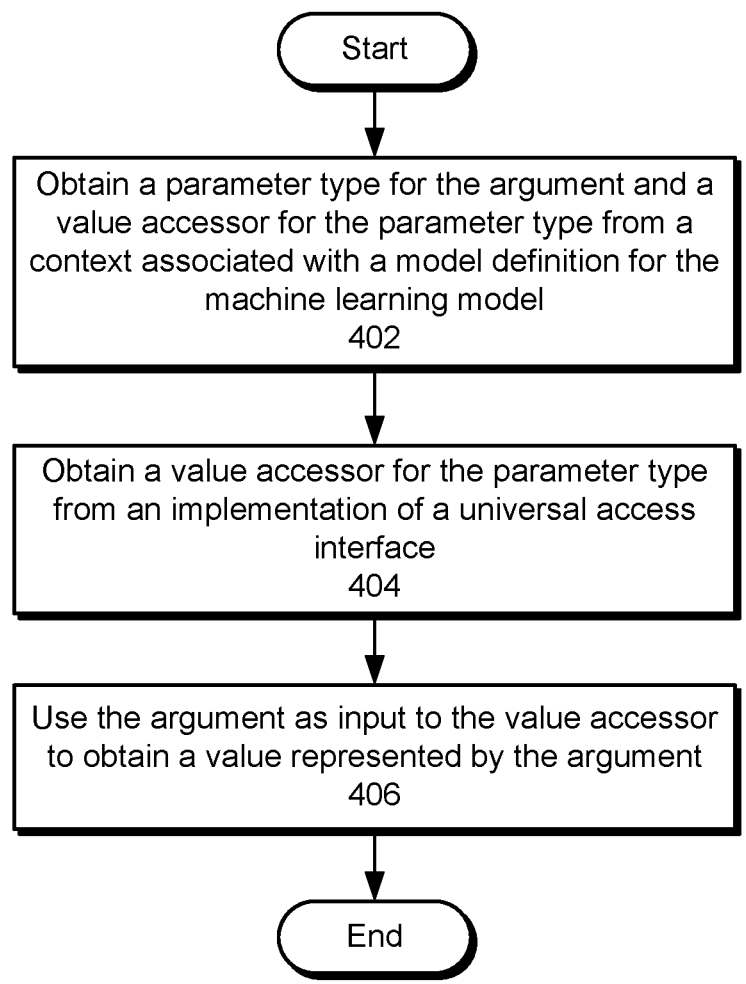
FIG. 4 shows a flowchart illustrating the processing of an argument of a function call in accordance with the disclosed embodiments.

FIG. 4 shows a flowchart illustrating the processing of an argument of a function call in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a parameter type for the argument is obtained from a context associated with a model definition for a machine learning model (operation 402). For example, the context may be generated from the model definition and stored in an internal representation of the machine learning model. The context may be a class and/or object that contains fully qualified names of all parameters, features, operators, constants, and/or other entities declared in the model definition. The context may also, or instead, contain and/or reference classes, objects, data sources, and/or other mechanisms for creating, storing, obtaining, calculating, and/or applying the entities during execution of the machine learning model. As a result, the argument may be matched to a name and/or other identifier for an entity in the context, and the parameter type may be obtained from additional information associated with the entity in the context.

Next, a value accessor for the parameter type is obtained from an implementation of a universal access interface (operation 404). For example, the argument may include an object that implements the universal access interface and stores a value associated with the parameter type. As a result, the value accessor may be included in one or more methods of the implementation.

The argument is then used as input to the value accessor to obtain a value represented by the argument (operation 404). Continuing with the previous example, the value accessor may be called to obtain a Boolean, double, float, long, and/or other type of data that is stored within the object. The value is then used to execute a function for calculating an attribute associated with the machine learning model, as discussed above.

Figure 5:
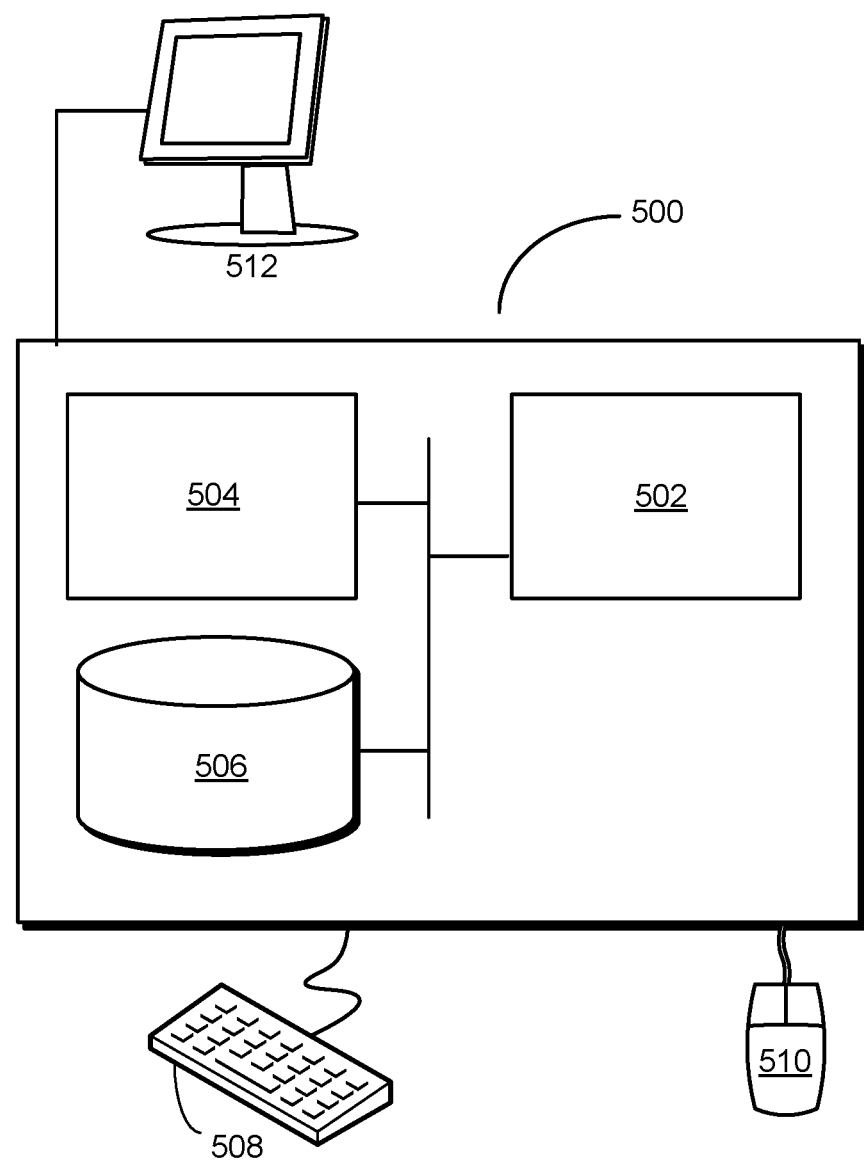
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system may include a model-creation apparatus and an evaluation apparatus, one or more of which may alternatively be termed or implemented as a module, mechanism, or other type of system component. The model-creation apparatus and/or evaluation apparatus may obtain a function call for a function that calculates an attribute associated with a machine learning model. For each argument of the function call, the model-creation apparatus and/or evaluation apparatus may identify a parameter type of the argument. The evaluation apparatus may then use a value accessor for the parameter type to obtain a value represented by the argument. Finally, the evaluation apparatus may calculate the attribute by applying the function to the value and use the attribute to execute the machine learning model.

In addition, one or more components of computer system 500 may be remotely located and connected to the other components over a network. Portions of the present embodiments (e.g., model-creation apparatus, evaluation apparatus, feature repository, etc.) may also be located on different nodes of a distributed system that implements the embodiments. For example, the present embodiments may be implemented using a cloud computing system that configures and executes a set of remote statistical models.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
obtaining a function call for a function that calculates an attribute associated with a machine learning model;
for each argument of the function call, identifying, by a computer system, a parameter type of the argument, wherein the parameter type represents a type of data used with the machine learning model;
obtaining a value accessor for retrieving features specific to the parameter type;
obtaining, by the computer system, a value represented by the argument using the value accessor;
calculating, by the computer system, the attribute by applying the function to the value; and
using the attribute to execute the machine learning model.

2. The method of claim 1, further comprising:
verifying a match between a data type of the value and an expected type from a function declaration for the function prior to applying the function to the value.

3. The method of claim 1, further comprising:
obtaining the argument through a universal access interface for accessing multiple parameter types associated with the machine learning model.

4. The method of claim 3, wherein identifying the parameter type of the argument comprises:
obtaining the parameter type from a context associated with a model definition for the machine learning model.

5. The method of claim 4, wherein using the value accessor for the parameter type to obtain the value represented by the argument further comprises:
obtaining the value accessor from an implementation of the universal access interface.

6. The method of claim 4, wherein the context is obtained from an internal representation of the machine learning model.

7. The method of claim 1, wherein using the value accessor for the parameter type to obtain the value represented by the argument comprises:
calling the value accessor from an object representing the argument.

8. The method of claim 1, wherein the value accessor is further associated with a data type of the argument.

9. The method of claim 1, wherein the attribute comprises at least one of:
a model parameter;
a request parameter;
a feature; or a set of documents used to execute the machine learning model.

10. The method of claim 1, wherein the parameter type is at least one of:
a model parameter;
a request parameter;
a feature; or
a constant.

11. A system, comprising:
one or more processors; and
memory storing instructions that, when executed by the one or more processors, cause the system to:
obtain a function call for a function that calculates an attribute associated with a machine learning model;
for each argument of the function call, identify a parameter type of the argument, wherein the parameter type represents a type of data used with the machine learning model;
obtain a value accessor for retrieving features specific to the parameter type;
obtain a value represented by the argument using the value accessor;
calculate the attribute by applying the function to the value; and
use the attribute to execute the machine learning model.

12. The system of claim 11, wherein the memory further stores instructions that, when executed by the one or more processors, cause the system to:
verify a match between a data type of the value and an expected type from a function declaration for the function prior to applying the function to the value.

13. The system of claim 11, wherein the memory further stores instructions that, when executed by the one or more processors, cause the system to:
obtain the argument through a universal access interface for accessing multiple parameter types associated with the machine learning model.

14. The system of claim 11, wherein identifying the parameter type of the argument comprises:
obtaining the parameter type from a context associated with a model definition for the machine learning model.

15. The system of claim 14, wherein using the value accessor for the parameter type to obtain the value represented by the argument further comprises:
obtaining the value accessor from an implementation of the universal access interface.

16. The system of claim 11, wherein the value accessor is further associated with a data type of the argument.

17. The system of claim 11, wherein the attribute comprises at least one of:
a model parameter;
a request parameter;
a feature; or
a set of documents used to execute the machine learning model.

18. The system of claim 11, wherein the parameter type is at least one of:
a model parameter;
a request parameter;
a feature; or
a constant.

19. A non-transitory computer-readable storage medium storing instructions that when executed by a computer cause the computer to perform a method, the method comprising:
obtaining a function call for a function that calculates an attribute associated with a machine learning model;
for each argument of the function call, identifying a parameter type of the argument, wherein the parameter type represents a type of data used with the machine learning model;
obtaining a value accessor for retrieving features specific to the parameter type;
obtaining a value represented by the argument using the value accessor;
calculating the attribute by applying the function to the value; and
using the attribute to execute the machine learning model.

20. The non-transitory computer readable storage medium of claim 19, wherein the method further comprises:
verifying a match between a data type of the value and an expected type from a function declaration for the function prior to applying the function to the value.

* * * * *